(No Model.)

J. MOORE.
SAW MILL DOG.

No. 287,308. Patented Oct. 23, 1883.

WITNESSES:
H. P. Hood.
Frank. A. Jacob.

INVENTOR:
James Moore

UNITED STATES PATENT OFFICE.

JAMES MOORE, OF FLAT ROCK, INDIANA.

SAW-MILL DOG.

SPECIFICATION forming part of Letters Patent No. 287,308, dated October 23, 1883.

Application filed April 2, 1883. (No model.)

*To all whom it may concern:*

Be it known that I, JAMES MOORE, a citizen of the United States, residing at Flat Rock, county of Shelby, and State of Indiana, have invented a new and useful Saw-Mill Dog, of which the following is a specification.

My invention relates to an improved dog for securing logs to head-blocks in saw-mills.

The objects of my improvements are, first, to provide means for quickly adjusting the dog laterally and vertically to logs of different sizes; second, to provide means for forcing the point of the dog into the log and for withdrawing it therefrom without striking it; and, third, to so construct the means for securing the vertical adjustment of the case carrying the dog and the means for forcing the dog into the log that each shall be independent of the other in its action.

The accompanying drawings illustrate my invention.

Figure 2:
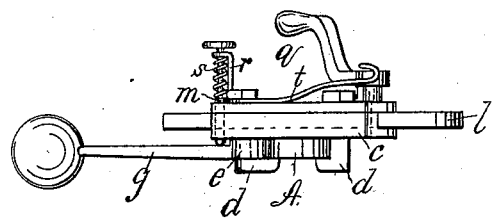
Figure 3:
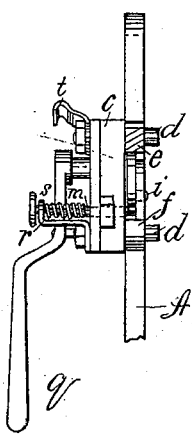
Figure 1:
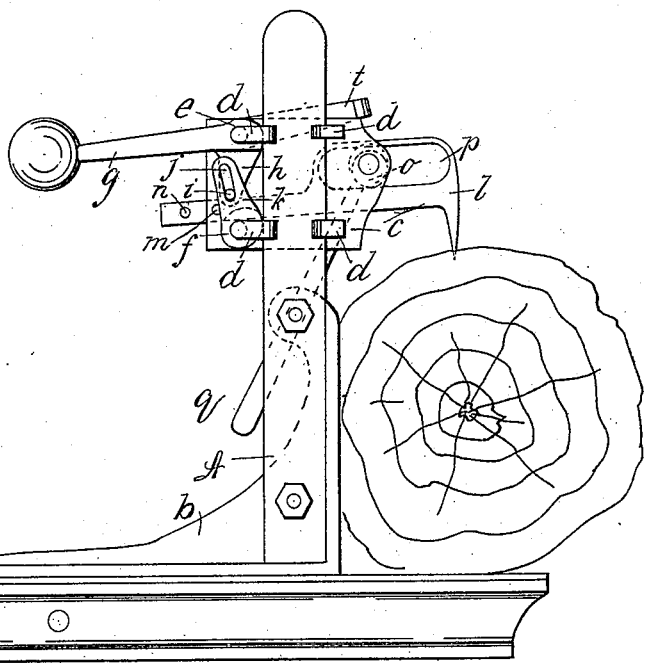

Figure 1 represents a side elevation of a head-block with my dog attached. Fig. 2 is a plan of the dog and its support. Fig. 3 is a rear view.

Like letters indicate the same parts in all the figures.

A is a standard with parallel sides and edges, bolted to the side of the sliding bracket $b$ of the head-block.

$c$ is a hollow casing having hook-headed bolts $d\ d\ d\ d$, adapted to embrace and slide freely upon the standard A. Said casing is sustained at any desired height on standard A by means of two cams, $e$ and $f$, which impinge against the edge of the standard and hold in opposite directions. Said cams are pivoted on the side of the casing, and are operated by the weighted lever $g$ simultaneously by means of an arm, $h$, formed on $e$, and having a pin, $i$, which engages a slot, $j$, in an arm, $k$, on cam $f$. $l$ is a hook having a sharp point to engage the log. It is adapted to slide laterally in $c$, and also to have a slight vertical movement therein. Said hook is sustained in case $c$ by a bolt, $m$, which passes through the case and one of a series of holes, $n\ n$, in the hook, and a cam, $o$, which is journaled in bearings in $c$, and engages the opposite sides of a slot, $p$, in the hook. Cam $o$ is revolved by a lever, $q$, secured to one of its journals. Bolt $m$ is sustained at one end by the bracket $r$, and is adapted to slide in and out through the case $c$ and hook $l$. A spiral spring, $s$, holds the bolt in. A flat spring, $t$, serves as a stop to the upward movement of lever $q$, and also holds said lever up by pressing against its side.

The operation of my device is as follows: The casing $c$ being near the top of the standard A, out of the way of the log when it is put on the head-block, and the log being in position, the hook $l$ is slid outward or inward, as may be desired, being secured in position by bolt $m$. Lever $g$ is seized with one hand of the operator and lever $q$ with the other. Lever $g$ is raised, and the peripheries of cams $e$ and $f$ being thereby withdrawn from the edge of standard A, the hook $l$ and its casing $c$ slide downward till the point of the hook comes in contact with the log. Lever $g$ is now released, and, falling, throws the cams $e$ and $f$ against the edge of the standard, thereby clamping the casing to the standard. Lever $q$ is now turned downward, revolving cam $o$, and turning its long side downward, thus forcing the point of the hook into the log and securely holding it, the hook swinging on bolt $m$ as a fulcrum. When the dog is to be withdrawn from the log, lever $q$ is turned upward, and the long side of the cam, engaging the upper side of slot $p$, forces the hook upward. It will be observed that the means for clamping the sliding case, in which the hook is mounted, to its supporting-standard, and the means for forcing the point of the hook into the log, are separate and independent in their action. Dogs of this class have before been made, in which the means for clamping the casing to the standard and the means for driving the point of the dog into the log were simultaneous in their action and mutually dependent. Such a construction requires the loosening of the clamping device every time the dog is released from the log, and is therefore inconvenient. This inconvenience I avoid.

I claim as my invention—

1. In a saw-mill dog, the combination, with a vertical standard secured to the head-block, and a casing adapted to embrace and slide upon said vertical standard, and carrying a hook adapted to engage a log, of a pair of cams pivoted to said casing, and adapted to impinge against said vertical standard and to hold in opposite directions, and means for operating said cams simultaneously, substantially as specified.

2. In a saw-mill dog, the combination, with a vertical standard secured to a head-block, a casing adapted to be adjustably secured to said vertical standard, and a cam journaled in said casing, of a hook adapted to engage a log and having a longitudinal slot embracing said cam, and a series of holes adapted to receive a pin, and a pin passing through the casing and engaging one of said series of holes in the hook, all substantially as and for the purpose specified.

JAMES MOORE.

Witnesses:
L. G. ALMEROTH,
ALVIN MOORE.